United States Patent
Young

(10) Patent No.: US 6,547,904 B1
(45) Date of Patent: Apr. 15, 2003

(54) METHOD AND APPARATUS FOR WELDING POLYMER FABRICS

(76) Inventor: Michael John Radley Young, Bremridge House, Bremridge, Ashburton, South Devon TQ13 7JX (GB)

( * ) Notice: Subject to any disclaimer, the term of this patent is extended or adjusted under 35 U.S.C. 154(b) by 0 days.

(21) Appl. No.: 09/600,154

(22) PCT Filed: Jan. 29, 1999

(86) PCT No.: PCT/GB99/00122
§ 371 (c)(1),
(2), (4) Date: Sep. 18, 2000

(87) PCT Pub. No.: WO99/38667
PCT Pub. Date: Aug. 5, 1999

(30) Foreign Application Priority Data

Jan. 30, 1998 (GB) ............................................. 9801983

(51) Int. Cl.[7] .............................................. B29C 65/08
(52) U.S. Cl. ..................... 156/73.1; 156/498; 156/580.2
(58) Field of Search ................................ 156/73.1, 498, 156/580.1, 580.2, 290, 308.2, 308.4

(56) References Cited

U.S. PATENT DOCUMENTS

| | | | | | |
|---|---|---|---|---|---|
| 2,633,894 | A | * | 4/1953 | Carwile | 154/42 |
| 3,457,132 | A | * | 7/1969 | Tuma et al. | 156/515 |
| 3,717,539 | A | * | 2/1973 | Roberts | 156/498 |
| 4,400,027 | A | * | 8/1983 | Nahon | 292/288 |
| 4,403,465 | A | * | 9/1983 | Bachner | 53/477 |
| 4,426,244 | A | * | 1/1984 | Wang | 156/498 |
| 4,475,966 | A | * | 10/1984 | Turner et al. | 156/73.1 |
| 5,249,416 | A | * | 10/1993 | Adams et al. | 53/463 |
| 5,662,766 | A | * | 9/1997 | Ishikawa et al. | 156/580.2 |
| 5,846,360 | A | * | 12/1998 | Gil | 156/73.1 |
| 5,885,409 | A | * | 3/1999 | Gil | 156/580.2 |

* cited by examiner

Primary Examiner—James Sells
(74) Attorney, Agent, or Firm—Oblon, Spivak, McClelland, Maier & Neustadt, P.C.

(57) ABSTRACT

The apparatus is adapted to weld ultrasonically two or more layers of fabric. The fabrics may be a woven or non-woven fabric of nylon, polyethylene or other polymeric material. The apparatus includes first and second opposed ultrasonically vibratable horns so spaced from one another that the layers of fabric may be passed between them. At least one, and optionally both, of the first and second horns is vibratable in an axial mode.

12 Claims, 4 Drawing Sheets

$\phi = 180°$  $\phi = 0°$

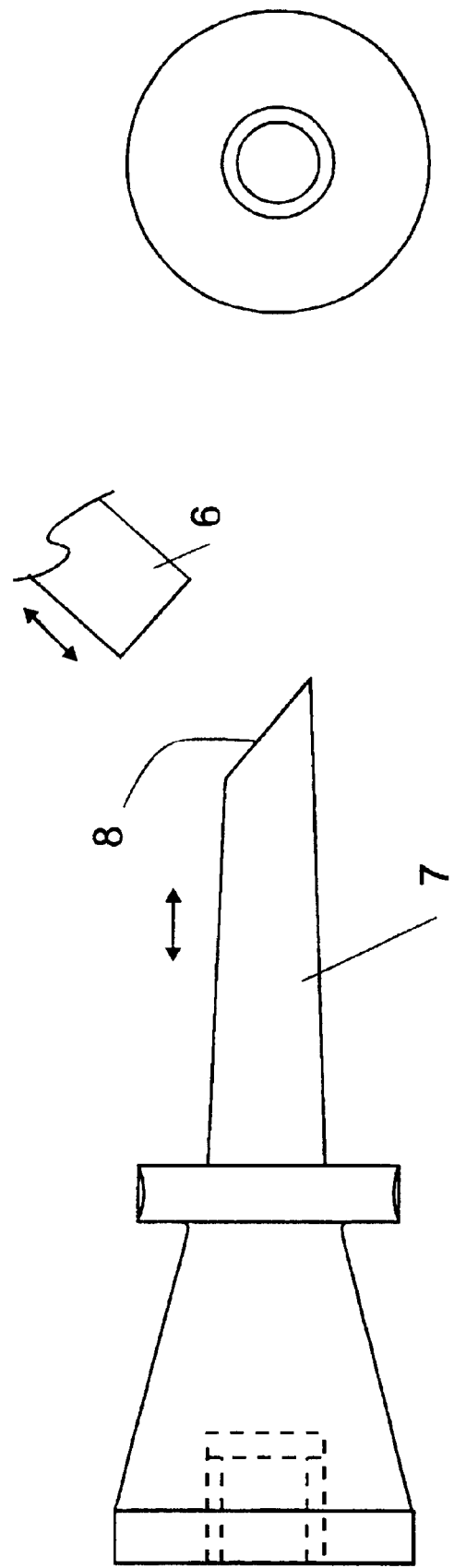

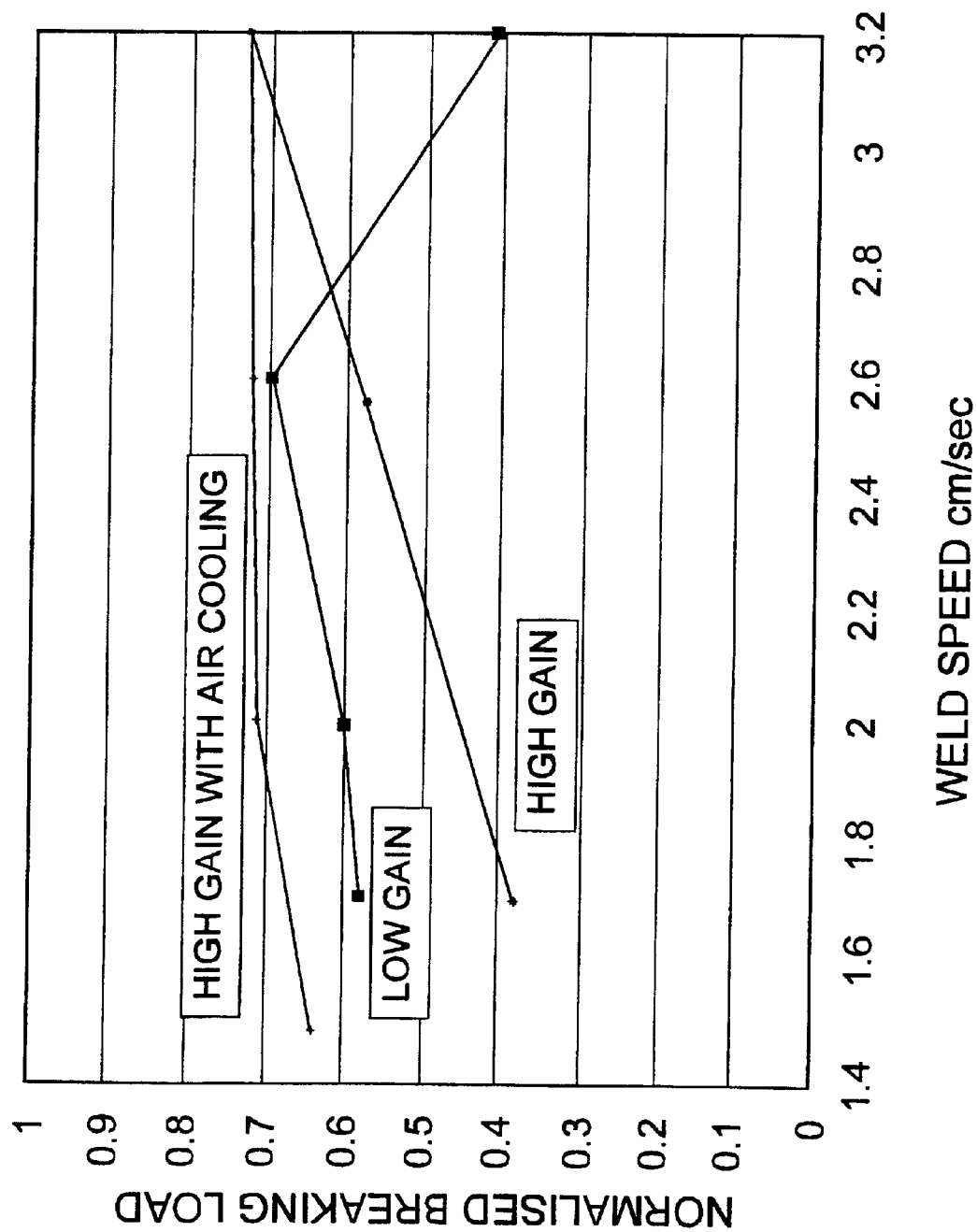

METHOD AND APPARATUS FOR WELDING POLYMER FABRICS

BACKGROUND OF THE INVENTION

1. Field of the Invention

The present invention relates to a method and apparatus for welding polymer fabrics using ultrasound. More particularly, but not exclusively, it relates to a method and apparatus for welding polymer fabrics or the like comprising a pair of ultrasonically vibrated horns acting on layers of fabrics to be welded.

2. Discussion of the Background

It is well known that certain polymers absorb ultrasound readily and by virtue of that property, offer scope for fusion bonding and other joining techniques. These phenomena have established a general application in the welding of engineering plastics, covering a wide range of techniques and encompassing products in many different markets. Of equal interest but less widely practised is the application of ultrasound to welding of woven or non-woven polymer fabrics. Considerable effort has been expended in developing ultrasound processing equipment for the manufacture of high strength non-woven or reinforced fabrics and specialised elasticated products.

One method of undertaking ultrasonic welding is disclosed by the present applicant in an earlier patent number GB 2299538 B, but other similar procedures are also known from U.S. Pat. No. 835,068, WO 94/11189, U.S. Pat. Nos. 249,416, 4,400,227, GB 8805949, U.S. Pat. No. 4,305,988, FR 2255023 and WO 95/09593.

However, not all the methods disclosed are entirely satisfactory and it is therefore an object of the present invention to provide a method and apparatus for welding polymer fabrics using ultrasound, which method is both effective, quick and is able to deal with different materials and different thicknesses of material.

Preferred polymer fabrics to be welded by the method and apparatus of this invention are those containing nylon and polyethylene, although other materials may also be welded.

SUMMARY OF THE INVENTION

According to a first aspect of the present invention, there is provided an apparatus for welding ultrasonically two or more layers of fabric comprising two opposed ultrasonically vibratable horns so spaced one from another that the layers of fabric may be passed between them.

Preferably at least one, optionally each, of the two horns is vibratable in axial mode.

Where both horns are vibratable in axial mode, the relative phase between the vibrations of the horns may be varied, whereby for constant amplitude vibrations the energy imparted may vary between a minimum at phase difference $\emptyset=0°$ and a maximum at phase difference $\emptyset=180°$.

Alternatively the frequencies at which the horns are adapted to vibrate may be so varied that one is vibratable at a frequency plus or minus between 1 and 20%, preferably in the region of 10%, of the frequency of the other.

In another embodiment, an axially vibratable horn may have an angled end face, and a second axially vibratable horn may vibrate in a direction substantially perpendicular to said end face.

The welding apparatus described above may further include a source of air directable generally toward a zone in which welding takes place.

The source of air may be a passageway extending substantially longitudinally of at least one of the welding horns to exit substantially centrally of the welding zone.

Alternatively the source of air or other cooling fluid may be a passageway longitudinal of one or both welding horns, the or each said passageway difurcating to permit exit of air through a plurality of annularly spaced outlets.

In another embodiment where one horn is vibratable in an axial mode, an opposed cooperating horn is vibratable in a torsional mode.

According to a second aspect of the present invention, there is provided a method of welding ultrasonically two or more layers of fabric comprising the steps of providing two opposed ultrasonically vibratable horns spaced one from another, and passing the layers of fabric between them whilst vibrating ultrasonically the horns.

Preferably at least one, optionally each, of the two horns is vibrated in axial mode.

Where both horns are vibrated in axial mode, the horns may be vibrated with a relative phase difference between them, said phase shift being variable between $\emptyset=0°$ for minimum energy and $\emptyset=180°$ for maximum energy.

Alternatively the horns may be so vibrated that one vibrates at a frequency plus or minus between 1 and 20%, preferably in the region of 10%, of the frequency of the other.

In another embodiment, one horn is vibrated in an axial mode whilst an opposed co-operating horn is vibrated in a torsional mode.

The method described above further includes the step of directing air or other cooling fluid toward a zone in which welding takes place.

BRIEF DESCRIPTION OF THE DRAWINGS

Embodiments of the present invention will now be more particularly described by way of example and with reference to the accompanying drawings, in which:

FIG. 3 shows welding by an axial mode vibratable horn having an angled face and a second horn vibratable in a direction perpendicular to said angled face;

FIG. 3A is an end view of the horn of FIG. 3;

FIG. 6 is a graph of breaking strength against weld speed, under various welding conditions.

DESCRIPTION OF THE PREFERRED EMBODIMENTS

Since the mechanism of fabric welding is dependent on generating heat in the workpiece, the oscillatory process should be designed to optimise this effect. The ideal process would result in adjacent fibres being fused locally rather than in bulk. This would form a union which was flexible and retained the "feel" of fabric, rather than giving a solid fused mass of amorphous material. Control of the welding process is conventionally effected by varying the ultrasonic power cycle and the force applied between the welding tool and supporting anvil placed beneath the workpiece. With fabrics having relatively fine fibres it would be a great advantage to have additional parameters allowing more delicate control of the fusion process.

One technique which would encourage this objective requires both a horn and an anvil horn to be vibrated but at different frequencies. One, say the anvil frequency, is deliberately moved to be approximately 300 Hz higher or lower than the frequency of the other. As a result, phase shifted opposed vibrations of ultrasonic energy would be applied at a frequency represented by the difference between the two systems, (namely one at 28 kHz, and the other at say 28.3 kHz or 27.7 kHz). This beating effect would greatly reduce the energy for a given amplitude of, say c. 80 $\mu$m, to about 100 Watts for each transducer, and permit hand controlled welding of small delicate materials which necessarily involves slower relative translational movement of fabric and tools.

Figure 1:
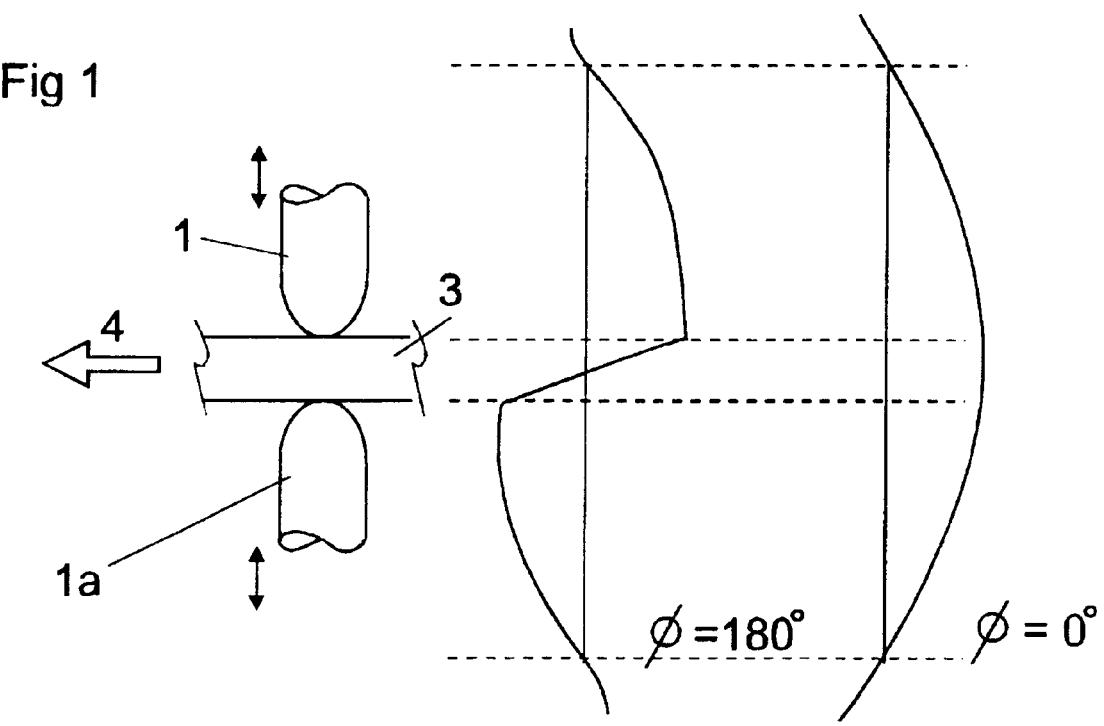
FIG. 1 shows a pair of axial mode vibratable horns in longitudinally opposed relationship and, graphically, the effect of phase control thereon.

Referring now to FIG. 1, this illustrates the effect on energy absorption of phase shift between two longitudinally opposed horns 1 and 1a, each in axial vibrational mode. By merely controlling the phase angle the weld energy can be varied between a minimum at Ø=0° and a maximum at Ø=180°, whilst maintaining stable horn resonance.

The application of vibrations simultaneously via both an anvil horn and a welding horn with phase shift between the two energised systems has the effect of varying the energy absorption from a minimum, probably zero, at 0° phase angle to a maximum at 180°.

This principle utilises two systems each operating in the longitudinal mode. However, if the horn is excited longitudinally and the anvil is excited in a transverse or orbital mode the resultant weld characteristic will be quite different. Relative oscillatory movement between adjacent fibres will produce very local heating and by defining carefully the contact pressure and energy input, local fusion can be produced in a controlled way.

Figure 2:
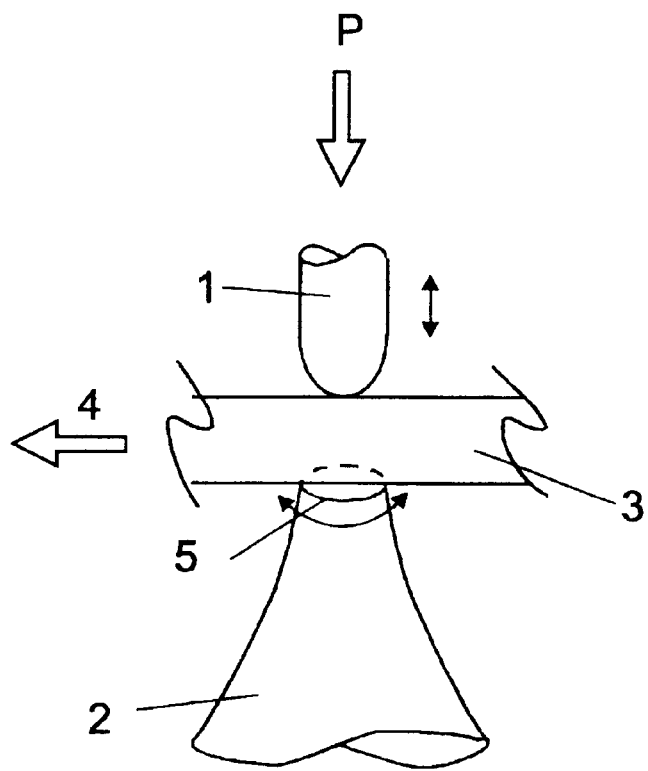
FIG. 2 shows welding by one axial mode horn opposed by a torsional mode horn.

This effect can be seen in FIG. 2 which shows an axial mode horn 1 with counterposed torsional mode horn 2. The fabric layers 3 are transported through a gap between the horns 1 and 2 in the direction indicated by arrow 4.

The effect of the torsional mode excitation at annular surface 5 rotates the fibres of the fabric whilst they are simultaneously being compressed by the axial displacement of horn 1 under direct pressure P. This oscillatory motion, if sufficiently energetic, creates friction heating between fibres, sufficient to induce fusing without the need to compress fully the fabric layers.

FIG. 3 illustrates two opposed horns with the fabric layers passing through them at an angle. In this case, one of the horns 7 is vibratable in an axial mode and has an angled end face 8 whilst the other horn 6 is vibratable in an axial mode perpendicular to the plane of the end face 8 of the first horn 7. Given the directions of vibrations of the horns, the offset angle between them causes localised heating and some rearrangement of the fibres of the fabrics passing between them, thereby welding the fabrics together.

Figure 5:
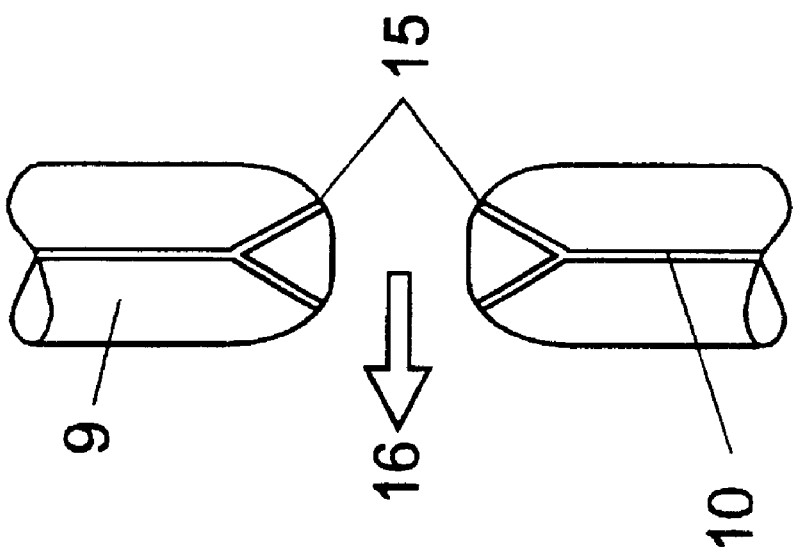
FIG. 5 shows an opposed pair of vibratable horns, each having a central passage for introduction of cooling air which passage splits into a plurality of annularly spaced outlets.
Figure 4:
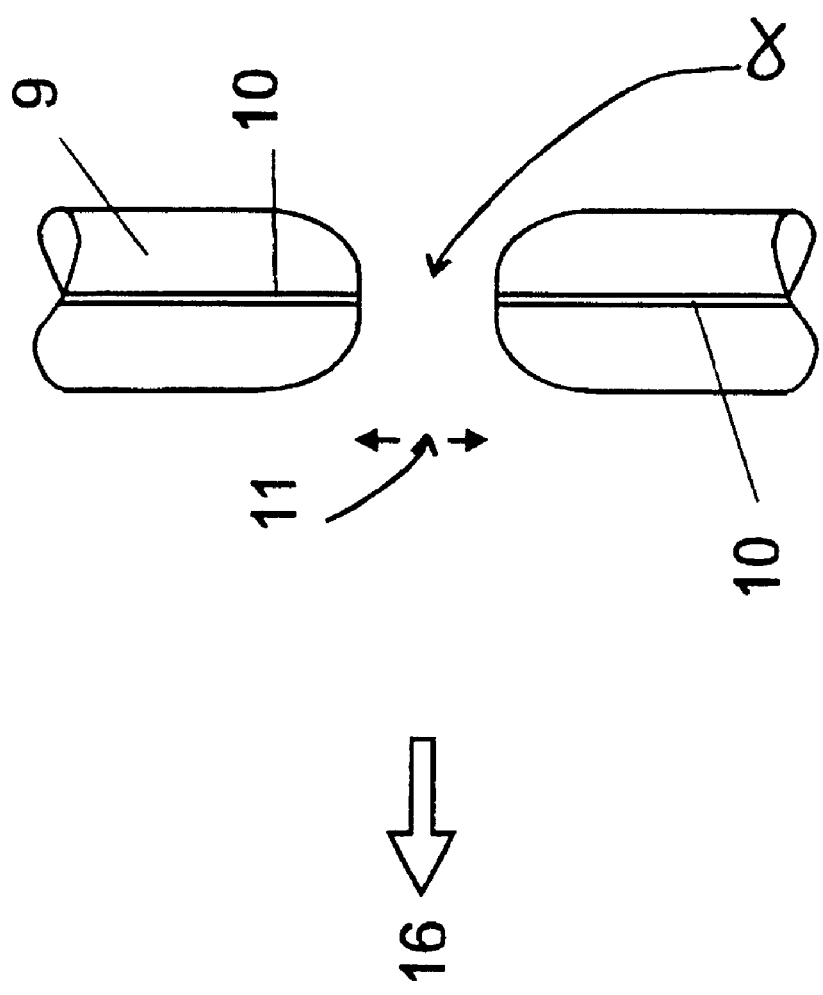
FIG. 4 shows an opposed pair of longitudinally vibratable horns, each having a central passage for introduction of cooling air.

There is shown in FIGS. 4 and 5 an air cooled welding system in which air is introduced through vibratable horns 9. In FIG. 4, the air passes along tube 10 arranged axially to the horn or horns 9 to be discharged centrally of the welding zone α. In FIG. 5, the passages 10 each split into a plurality of passages, which exit through a corresponding plurality of holes 15 arranged annularly to surround the centre of the welding zone α.

In both FIGS. 4 and 5, the passage of the materials to be welded is shown as 16. In both cases, alternative forms of introduction of cooling fluid are possible.

FIG. 6 is a graph of breaking strength versus weld speed for different horn characteristics. High gain horns with air cooling produce good weld strength with low speed sensitivity. The results without air suggest that careful balance of the energy input per unit volume of material (a function of speed) with the cooling effect of injected air, could lead to optimised weld quality. The objective of high speed welding with consistent high strength could be achieved with a relatively simple mechanical system.

What is claimed is:

1. An apparatus for welding ultrasonically two or more layers of fabric comprising:
   first and second opposed ultrasonically vibratable horns configured to be spaced from one another so that the two or more layers of fabric may be passed between the first and second horns, wherein the first and second horns are both vibratable in an axial mode at frequencies which are so variable that the first horn is vibratable at a frequency between 1 and 20% greater than the frequency at which the second horn is vibratable.

2. The apparatus according to claim 1, wherein the first horn is adapted to vibrate at a frequency 10% greater than the frequency at which the second horn is vibratable.

3. The apparatus according to claim 1, wherein the first axially vibratable horn has an end face angled with respect to a vibrational axis, and the second axially vibratable horn is vibratable in a direction substantially perpendicular to the end face.

4. The apparatus according to claim 3, wherein a relative phase between vibrations of the first and second horns is so variable that, for constant amplitude vibrations, energy to be imparted varies between a minimum at phase difference ø=0° and a maximum at phase difference ø=180°.

5. The apparatus according to claim 1, wherein the source of cooling fluid comprises a passageway extending substantially longitudinally of at least the first horn to exit centrally of a zone in which welding takes place.

6. The apparatus according to claim 5, wherein the source of cooling fluid includes a plurality of annularly spaced outlets, said passageway difurcating to connect to each of said annularly spaced outlets to permit exit of cooling fluid therethrough.

7. An apparatus for welding ultrasonically two or more layers of fabric comprising:
   first and second opposed ultrasonically vibratable horns spaced from one another so that the two or more layers of fabric may be passed between the first and second horns, wherein the first horn is vibratable in an axial mode and the second horn is vibratable in a tornsional mode.

8. The apparatus according to claim 7, further comprising a source of cooling air adapted to be directed generally towards a zone in which welding takes place.

9. The apparatus according to claim 8, wherein the source of cooling air comprises a passageway extending within and substantially longitudinally of at least the first horn to exit centrally of a zone in which welding takes place.

10. The apparatus according to claim 8, wherein the source of cooling air comprises a passageway extending within and longitudinally of at least the first horn and the source of cooling air includes a plurality of annularly spaced outlets, said passageway difurcating to connect each of the annularly spaced outlets to permit exit of cooling air therethrough.

11. A method of welding ultrasonically two or more layers of fabric, the method comprising the steps of:
   providing first and second opposed ultrasonically vibratable horns spaced from one another; and passing the layers of fabric between the first horn and the second horn while ultrasonically vibrating the first horn in an axial mode and the second horn in a tornsional mode.

12. The method of claim 11, further comprising directing cooling air towards a zone in which welding takes place.

* * * * *